United States Patent
Thuresson

(10) Patent No.: US 11,956,552 B2
(45) Date of Patent: Apr. 9, 2024

(54) METHOD AND ELECTRONIC DEVICE FOR INCREASED DYNAMIC RANGE OF AN IMAGE

(71) Applicant: Axis AB, Lund (SE)

(72) Inventor: Axel Thuresson, Lund (SE)

(73) Assignee: AXIS AB, Lund (SE)

( * ) Notice: Subject to any disclaimer, the term of this patent is extended or adjusted under 35 U.S.C. 154(b) by 366 days.

(21) Appl. No.: 17/505,682

(22) Filed: Oct. 20, 2021

(65) Prior Publication Data

US 2022/0159167 A1 May 19, 2022

(30) Foreign Application Priority Data

Nov. 17, 2020 (EP) .................................... 20208033

(51) Int. Cl.
*H04N 23/741* (2023.01)
*G06T 5/70* (2024.01)
*H04N 23/74* (2023.01)

(52) U.S. Cl.
CPC ............. *H04N 23/741* (2023.01); *G06T 5/70* (2024.01); *H04N 23/74* (2023.01); *G06T 2207/20208* (2013.01)

(58) Field of Classification Search
CPC ........... G06T 2207/20208; G06T 5/008; G06T 5/009; G06T 5/007; G06T 5/002; H04N 23/741; H04N 23/74
See application file for complete search history.

(56) References Cited

U.S. PATENT DOCUMENTS

| | | | | |
|---|---|---|---|---|
| 5,144,442 A * | 9/1992 | Ginosar | ................ | H04N 23/70 348/222.1 |
| 7,454,136 B2 * | 11/2008 | Raskar | ...................... | G06T 5/50 348/222.1 |
| 9,554,059 B1 * | 1/2017 | Lin | ...................... | H04N 25/589 |
| 2009/0086074 A1 * | 4/2009 | Li | .......................... | H04N 23/73 348/E3.018 |
| 2009/0175555 A1 * | 7/2009 | Mahowald | ............. | H04N 23/63 382/274 |

(Continued)

FOREIGN PATENT DOCUMENTS

CN 111028189 A * 4/2020 ............... G06T 5/50

OTHER PUBLICATIONS

Office Action dated Oct. 28, 2023 in Chinese Patent Application No. 202111353166.8, 7 pages. (with Partial English Translation).

*Primary Examiner* — Dung Hong
(74) *Attorney, Agent, or Firm* — XSENSUS LLP

(57) ABSTRACT

A method includes controlling a light source to output a first intensity of light while an image-capturing device captures a scene in a first upcoming image frame with a first exposure value setting, controlling the light source to switch from the first to a second intensity of light so the light source outputs the second intensity of light while capturing the scene with a second upcoming image frame with a second exposure value setting, wherein the second intensity of light is higher than the first intensity of light when the second exposure value setting is higher than the first exposure value setting, and the second intensity of light is lower than the first when the second exposure value setting is lower than the first exposure value setting, and stitching the first upcoming image frame with the second upcoming image frame into a high-dynamic range image frame.

14 Claims, 11 Drawing Sheets

(56) References Cited

U.S. PATENT DOCUMENTS

| | | | |
|---|---|---|---|
| 2010/0225783 A1* | 9/2010 | Wagner | G02B 27/1066 |
| | | | 348/E5.037 |
| 2014/0044366 A1* | 2/2014 | Yamaguchi | H04N 23/741 |
| | | | 382/284 |
| 2014/0192225 A1* | 7/2014 | Laroia | H04N 23/75 |
| | | | 348/229.1 |
| 2015/0229819 A1* | 8/2015 | Rivard | H04N 23/743 |
| | | | 348/362 |
| 2017/0142312 A1* | 5/2017 | Dal Mutto | G06T 7/285 |
| 2019/0108388 A1* | 4/2019 | Rivard | G06T 5/008 |
| 2019/0149706 A1* | 5/2019 | Rivard | H04N 23/73 |
| | | | 348/371 |
| 2019/0246025 A1* | 8/2019 | Duran | H04N 23/73 |
| 2020/0344430 A1* | 10/2020 | Wang | H01L 27/14621 |
| 2020/0400498 A1* | 12/2020 | Talbert | G01J 3/2823 |
| 2020/0400824 A1* | 12/2020 | Talbert | G01S 17/89 |

\* cited by examiner

METHOD AND ELECTRONIC DEVICE FOR INCREASED DYNAMIC RANGE OF AN IMAGE

CROSS-REFERENCE TO RELATED APPLICATION

This application claims priority to European Patent Application No. 20208033.9, filed on Nov. 17, 2020, the disclosure of which is incorporated herein by reference in its entirety.

TECHNICAL FIELD

The embodiments herein relate to a method and an electronic device for increasing a dynamic range of an image. A corresponding computer program and a computer program carrier are also disclosed.

BACKGROUND

Surveillance of the public using imaging, in particular video imaging, is common in many areas around the world. Areas that may need monitoring are for example banks, stores, and other areas where security is needed, such as schools and government facilities. Other areas that may need monitoring are processing, manufacturing and logistics applications where video surveillance is primarily used to monitor processes.

Sometimes it can be difficult to capture details in a scene that are very dark or very bright due to the limited dynamic range of the image-capturing medium, such as a digital image sensor. Standard imaging techniques allow differentiation only within a certain range of brightness. Outside this range, no features are visible because in the brighter areas everything appears pure white, and pure black in the darker areas.

A ratio between a maximum and a minimum of a tonal value in an image is known as the dynamic range. Revealing detail in the darkest of shadows requires high exposures, while preserving detail in very bright situations requires very low exposures. Most cameras cannot provide this range of exposure values within a single exposure, due to their low dynamic range. For example, FIG. 1a illustrates a sensitivity curve of an image sensor where a pixel level is dependent on the relative exposure value (EV) for a certain illumination of a scene. For very low and high exposures, e.g. for relative EVs 1-3 and 11-13, the contrast in pixel level between different exposure values is so low that details will not be revealed, as the pixel level is basically the same irrespective of exposure value.

Today, high-dynamic-range (HDR), sometimes also referred to as wide-dynamic range (WDR), images are generally achieved by capturing multiple standard-exposure images and then later merging them into a single HDR image. As an example, it is possible to combine several different, narrower range, exposures of the same subject matter.

Even when using HDR techniques there may be scenes that are not imaged satisfactorily due to the limited dynamic range of the camera.

SUMMARY

An object of embodiments herein may thus be to obviate some of the problems mentioned above, or at least reduce the impact of them. Specifically, an object may be to increase a dynamic range that may be captured by an image.

According to an aspect, the object is achieved by a method for generating a high-dynamic range image. The method comprises:
instructing a controller of a light source to control the light source to output a first intensity of light while an image-capturing device captures a scene in a first upcoming image frame with a first exposure value setting, and
instructing the controller of the light source to control the light source to change from the first intensity of light to a second intensity of light such that the light source outputs the second intensity of light while the image-capturing device captures the scene with a second upcoming image frame with a second exposure value setting.

The second intensity of light is higher than the first intensity of light when the second exposure value setting is higher than the first exposure value setting, and
the second intensity of light is lower than the first intensity of light when the second exposure value setting is lower than the first exposure value setting.

The method further comprises stitching the first upcoming image frame with the second upcoming image frame into a high-dynamic range image frame.

According to another aspect, the object is achieved by an electronic device configured to perform the above method.

According to further aspects, the object is achieved by a computer program and a computer program carrier corresponding to the aspects above.

By stitching two image frames of the same scene from the same image stream with two different exposure setting values, where the light intensity from the light source is higher for the frame with the high exposure value setting, e.g. high values of exposure time and sensor gain, than for the frame with the lower exposure value setting, the dynamic range of the scene that can be captured with the image-capturing device can be increased.

A further advantage of embodiments herein is that they may take into account positions of multiple light sources in relation to the objects in the scene, such that objects near and far away may be illuminated more optimally.

BRIEF DESCRIPTION OF THE DRAWINGS

In the figures, features that appear in some embodiments are indicated by dashed lines.

The various aspects of embodiments disclosed herein, including particular features and advantages thereof, will be readily understood from the following detailed description and the accompanying drawings, in which.

DETAILED DESCRIPTION

Figure 1A:
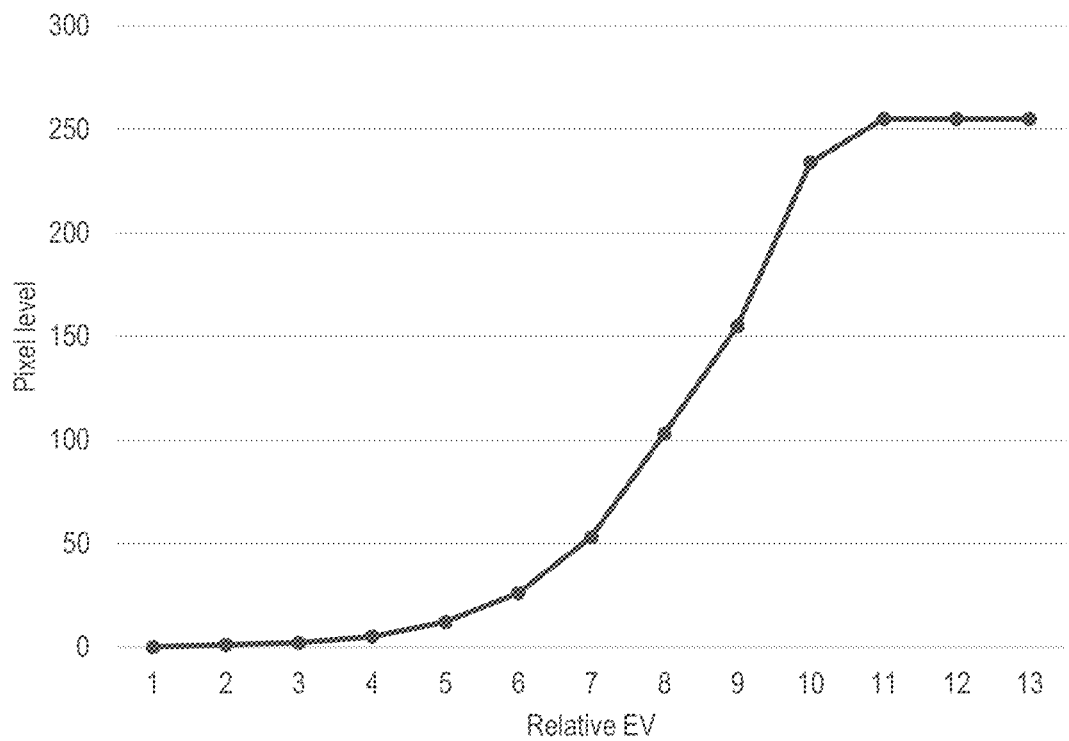
FIG. 1a illustrates a sensitivity curve of an image sensor.
Figure 1B:
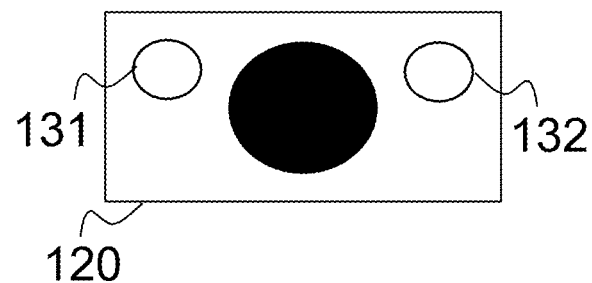
FIG. 1b is a schematic overview illustrating exemplifying embodiments herein.
Figure 1C:
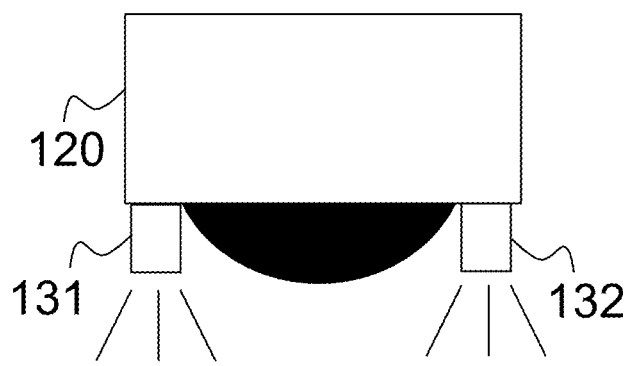
FIG. 1c illustrates objects in a scene in relation to exemplifying embodiments herein.
Figure 1C:
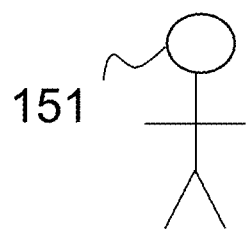
Figure 1C:
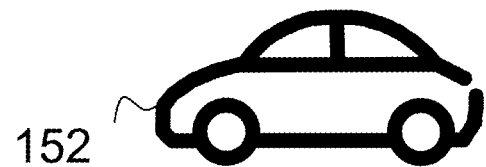

As mentioned above it may be of interest to improve a dynamic range of a scene which can be captured with a video camera. An illustrating example problem will now be described with the help of FIG. 1b and FIG. 1c. FIG. 1b shows a video camera 120 from a front view. The video camera 120 may comprise light sources 131, 132, e.g. to increase the amount of light that reaches the video camera 120 by illuminating objects that are to be captured by the video camera 120. FIG. 1c shows the video camera 120 from a top view together with a first object 151 to be captured and a second object 152 to be captured by the video camera 120. The first object 151 is closer than the second object 152 to the video camera 120. When the video camera 120 captures the scene comprising the first and second objects 151, 152 the illuminating light from the light sources 131, 132 will travel different lengths to and from the two objects 151, 152 and thus the light that is reflected from the second object 152 and subsequently captured by the video camera 120 will in many situations be much less than the light that is reflected from the first object 151 and subsequently captured by the video camera 120.

One way of solving this problem is by capturing multiple standard-exposure images, such as two standard-exposure images, and then later merging them into a single HDR image, e.g. by stitching.

Stitching may mean that image data from overlapping image sensors are blended, e.g. using different weights in the portions where there is an overlap between the images from the sensors. It is also possible to stitch image data from the same image sensor, e.g. blending consecutive image frames using different weights for the respective image frame. Different weights may also be applied to different parts of the respective image frame.

As an example, it is possible to combine several different, narrower range, exposures of the same subject matter, e.g. with different exposure times. However, also such HDR-techniques have a limited dynamic range, and sometimes even such HDR-techniques may not be able to resolve details which are very dark or very bright. For example, the scene of FIG. 1c has a high dynamic range. One common WDR-technique is to collect a "long frame" and a "short frame", e.g. the long frame is a frame with a long exposure and the short frame is a frame with a short exposure. In this case, the short frame collects information of the objects close to the camera, such as the first object 151, and the long frame collects information of objects far away from the camera, such as the second object 152. If the WDR-technique works as expected the objects close to the camera are not overexposed and objects far away are not underexposed.

However, every camera has a limited dynamic range which means that if a scene has a higher dynamic range than the camera can achieve, we will not be able to capture all the available information in the scene. Thus, the resulting stitched image may still not resolve details that are very bright or very dark due to the limited dynamic range of the video camera 120 in comparison to the dynamic range of the scene.

In embodiments herein, this problem is solved by synchronizing an exposure of an image frame with a control of light intensity of the light sources 131, 132 illuminating the scene that is captured by the video camera, e.g. by synchronizing the outgoing light intensity on a frame-to-frame basis, and more specifically on a "long frame"-to-"short frame" basis.

Thus, to increase the dynamic range of the video camera 120 a long frame capturing objects far away from the video camera 120 may be synchronized with a high light intensity from the light sources 131, 132, while a short frame capturing objects close to the camera may be synchronized with a low light intensity from the light sources 131, 132. In other words, with increased outgoing light intensity captured in the long frame and decreased outgoing light intensity captured in the short frame it is possible to increase the dynamic range by capturing objects further away from the video camera 120 than would otherwise be possible while maintaining a good exposure for objects very close to the video camera 120.

In an example it is possible to reduce the light intensity during the short frame such that objects close to the video camera 120 are not overexposed.

The high- and low-intensity frames may then be stitched together to form an HDR-frame. It is also possible to merge more than two frames for which different light intensities have been used if needed.

Figure 2A:
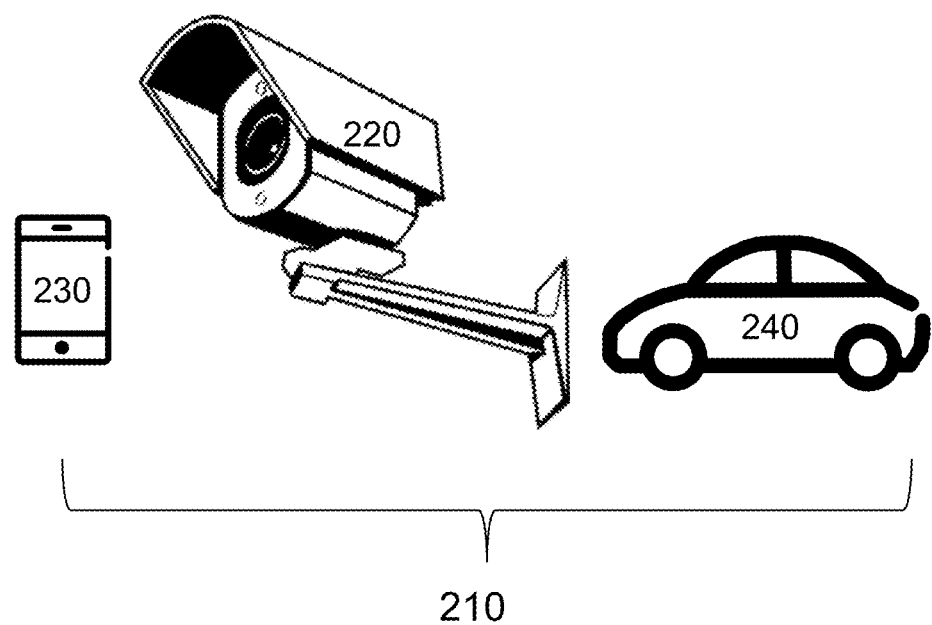
FIG. 2a illustrates exemplifying embodiments of image-capturing devices.

Embodiments herein may be implemented in one or more electronic devices, such as an image-capturing device, e.g. a digital camera. FIG. 2a depicts various exemplifying image-capturing devices 210. The image-capturing device 210 may e.g. be a camcorder, a video recorder, a video camera 220 such as a surveillance camera or a monitoring camera, a digital camera, a smartphone 230 including an image sensor, or a car 240 including an image sensor.

Figure 2B:
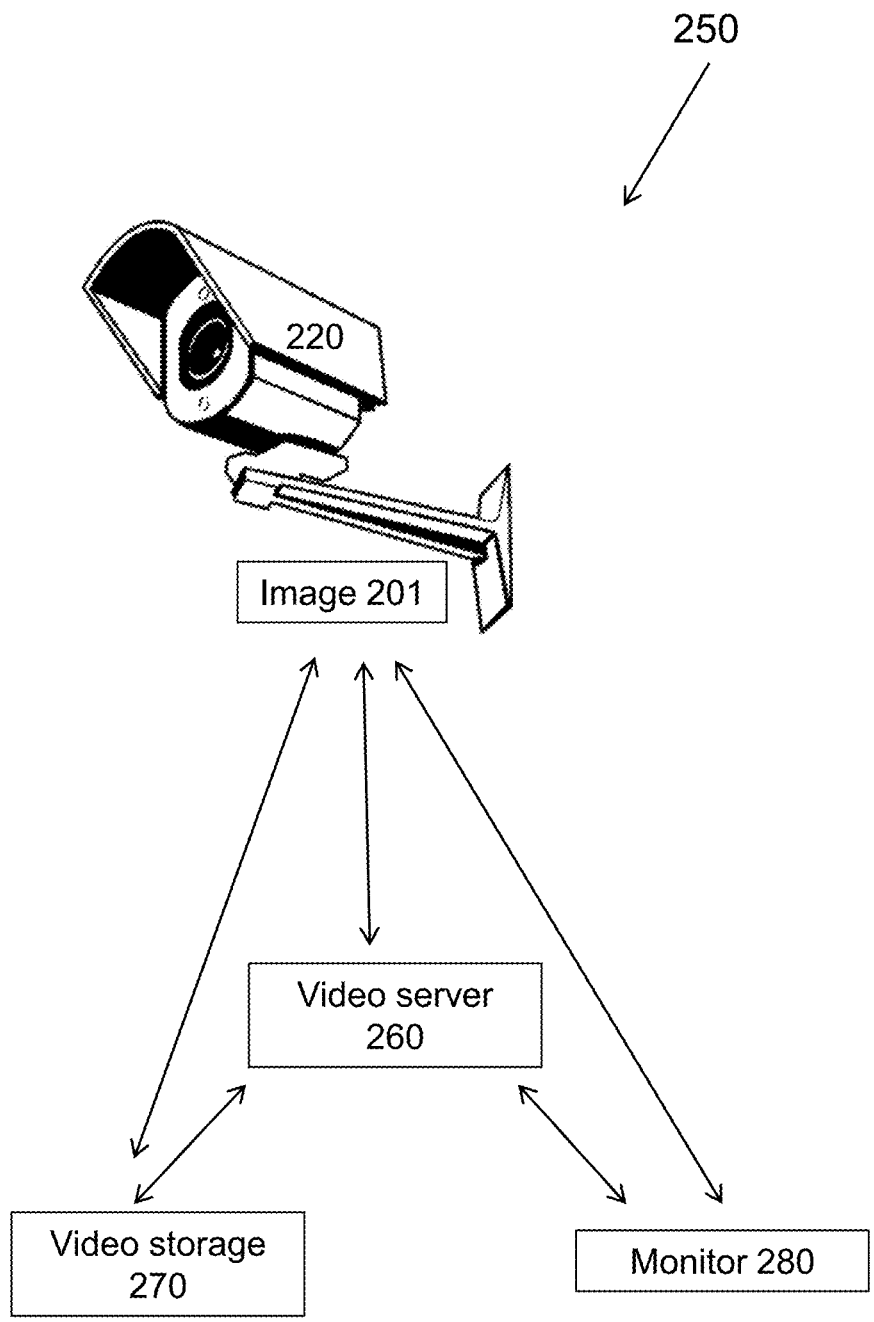
FIG. 2b illustrates exemplifying embodiments of a video network system.

FIG. 2b depicts an exemplifying video network system 250 in which embodiments herein may be implemented. The video network system 250 may include the video camera 220 which can capture and perform image processing on one or more digital images 201, such as a stream of digital video images. The video camera 220 may be connected over the network 250 to a video server 260, which may address needs of particular applications and deliver the stream of digital video images via a computer network. The video camera 220 may further be connected to a video storage 270 for storage of video images, and/or connected to a monitor 280 for display of video images. In some embodiments the video camera 220 is connected directly with the video storage 270 and/or the monitor 280, as indicated by the direct arrows between these devices in FIG. 2b. In some other embodiments the video camera 220 is connected to the video storage 270 and/or the monitor 280 via the video server 260, as indicated by the arrows between the video server 260 and the other devices.

The video server 260 may be a computer-based device that is dedicated to delivering video. Video servers are used in a number of applications, and often have additional functions and capabilities that address the needs of particular applications. For example, video servers used in security, surveillance and inspection applications typically are designed to capture video from one or more cameras and deliver the video via a computer network. In video production and broadcast applications, a video server may have the ability to record and play recorded video, and to deliver many video streams simultaneously. Today, many video server functions may be built-in in the video camera 220.

In order to better understand embodiments herein an imaging system will first be described.

Figure 3A:
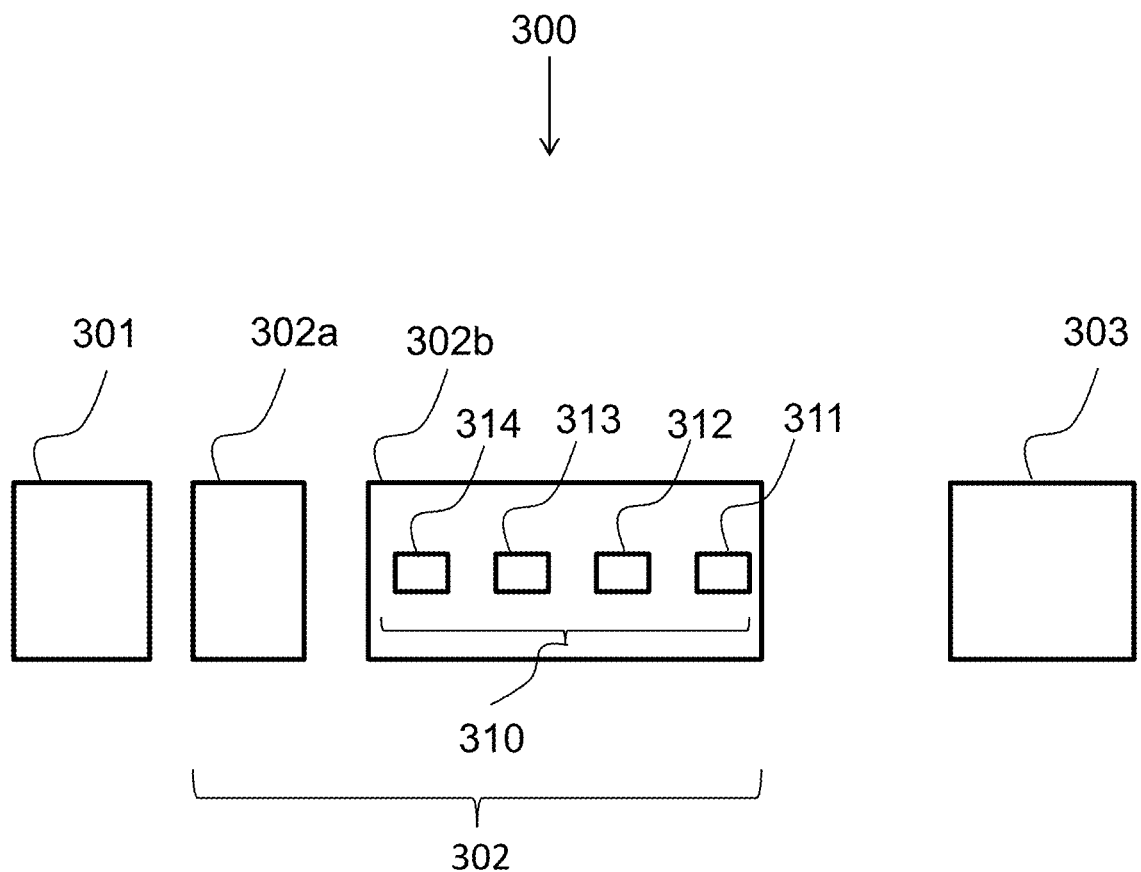
FIG. 3a is a schematic overview illustrating exemplifying embodiments of an imaging system.

FIG. 3a is a schematic view of an imaging system 300, in this case of a digital video camera, such as the video camera 220. The imaging system images a scene on an image sensor 301. The image sensor 301 may be provided with a Bayer filter, such that different pixels will receive radiation of a particular wavelength region, in a known pattern. Typically, each pixel of a captured image is represented by one or more values representing the intensity of the captured light within a certain wavelength band. These values are usually referred to as colour components, or colour channels. In embodiments herein, the term "image" may refer to an image frame or video frame including information originating from an image sensor that has captured the image. Further, in embodiments herein the term "image" may also refer to a stream of images, such as a stream of video images, wherein multiple images, such as each image, that is part of the stream of images may undergo actions that are described below as performed on the image.

After having read the signal of individual sensor pixels of the image sensor 301, different image processing actions may be performed, such as demosaicing and color correction.

Figure 3B:
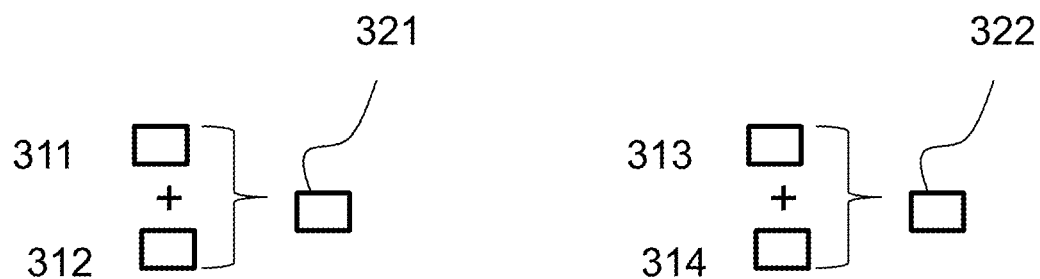
FIG. 3b illustrates exemplifying embodiments of stitching of two image frames.

The resulting image is forwarded to an image processing pipeline 302. In the image processing pipeline 302, further processing is performed on the image. In embodiments herein such further processing may for example be stitching two low dynamic range images together into one HDR image. FIG. 3b illustrates such image stitching processes, wherein a first such stitching process a first image frame 311 and a second image frame 312, such as two low-dynamic range image frames, are stitched to produce a resulting HDR image frame 321. Among the two image frames 311, 312 one has a higher exposure value setting than the other such that dark details can be captured from the high-exposure image frame, while bright details can be captured from the low-exposure image frame. More than two frames may also be stitched together. For video streams stitching of images may be continuously ongoing, and the stitched images may be part of a stream of images that is sent to a client.

It should be noted that for video cameras an outgoing frame rate from the video camera, e.g. a rate corresponding to the display rate of the image frames on a display, such as 30 fps or 60 fps, may set limitations to the time that can be spent on image processing, specifically if live video-streams are needed.

Further processing may also comprise noise filtering (for eliminating spatial and/or temporal noise), distortion correction (for eliminating effects of, e.g., barrel distortion), global and/or local tone mapping (e.g., enabling imaging of scenes containing a wide range of intensities), transformation (e.g., rotation), flat-field correction (e.g., for removal of the effects of vignetting), application of overlays (e.g., privacy masks, explanatory text), etc. The image processing pipeline 302 may also be associated with an analytics engine performing object detection, recognition, alarms, etc.

The image processing pipeline 302 may comprise an image processing part 302a and a video post-processing part 302b. The image processing part 302a may e.g. apply noise filtering, distortion correction, global and/or local tone mapping, transformation, and flat-field correction. The video post-processing part 302b may for example perform image stabilization, crop parts of an image, apply overlays, and comprise the analytics engine. Stitching may be performed relatively late in the image processing pipeline 302, e.g. in the video post-processing part 302b. In some embodiments, at least noise filtering has been performed before stitching is performed.

Following the image processing pipeline 302 the image may be forwarded to an encoder 303, wherein the information in the image frames is coded according to an encoding protocol, such as H.264, and forwarded to for example a receiving client, exemplified here with the monitor 280, to the video server 260, the video storage 270, etc.

Figure 3C:
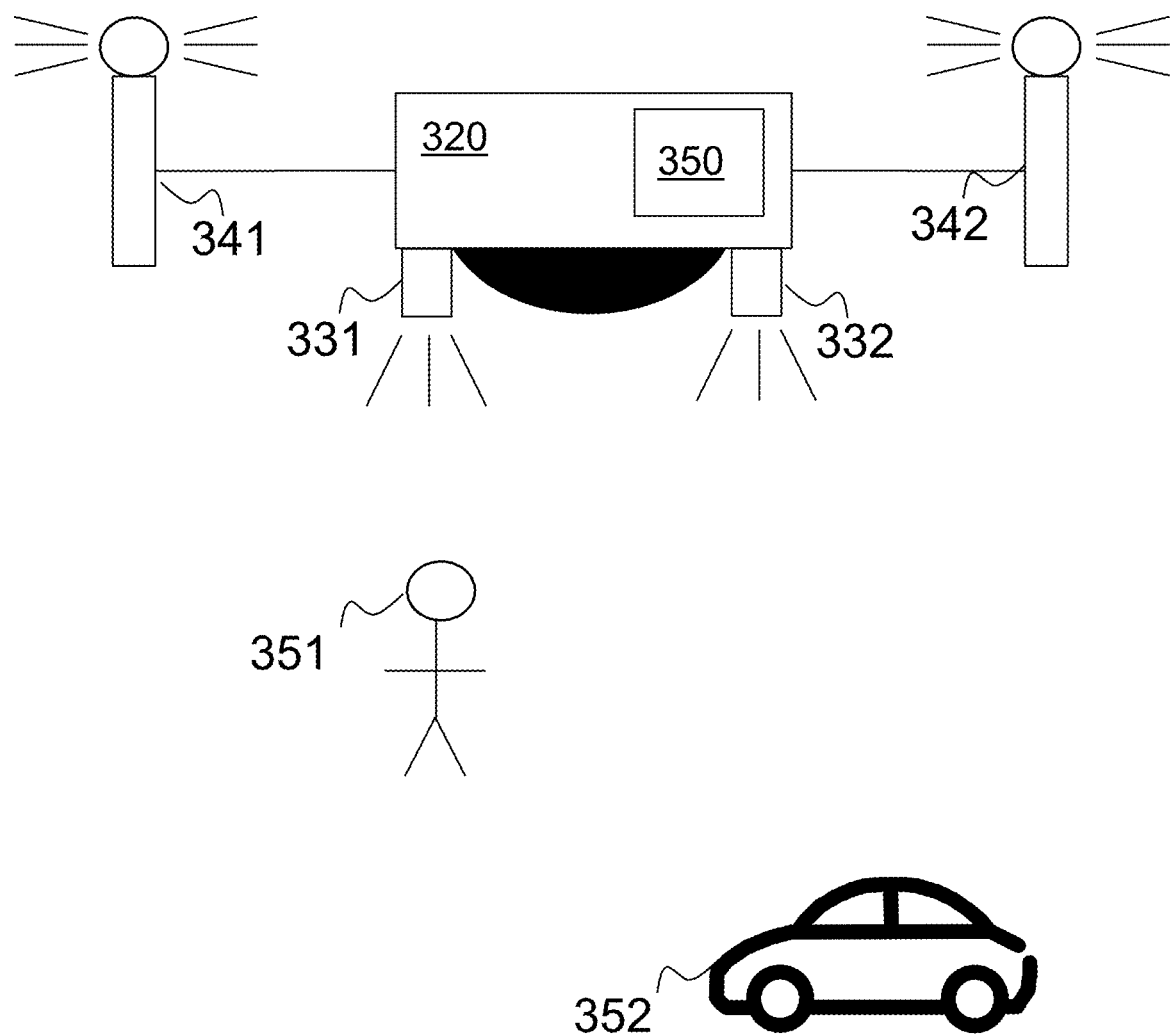
FIGS. 3c-e illustrate exemplifying embodiments herein.

Exemplifying embodiments herein will now be described with reference to FIG. 3c. FIG. 3c illustrates an example electronic device, in the form of a video camera 320, from a view from above. The video camera 320 is configured to control, either directly, or indirectly through for example an internal or external controller, at least one light source. The controller is not shown in FIG. 3c but will be discussed further below.

Thus, in some embodiments the video camera 320 comprises at least one light source, such as a first light source 331, and a second light source 332. In other embodiments the video camera 320 is configured to control at least one external light source, such as a first external light source 341, and a second external light source 342. In some embodiments the video camera 320 comprises an internal controller 350 that controls the internal or external light sources.

The light sources may for example increase the amount of light that reaches the video camera 320 by illuminating objects that are to be captured by the video camera 320. FIG. 3c further shows the video camera 320 together with a first object 351 to be captured and a second object 352 to be captured by the video camera 320. The first object 351 is closer than the second object 352 to the video camera 320. When the video camera 320 captures the scene comprising the first and second objects 351, 352 illuminated by the light from the light sources 331, 332 the light that is reflected from the second object 352 and subsequently captured by the video camera 320 will in many situations be much less than the light that is reflected from the first object 351 and subsequently captured by the video camera 320.

Thus in embodiments herein there may be several light sources that are well positioned and synchronized on a frame-to-frame basis with the video camera 320.

Furthermore, if there are multiple video cameras 320 covering a scene it is possible to synchronize all those video cameras 320 as well as the light sources on a frame-to-frame basis to obtain optimal results. For example, it is possible to avoid bad results, such as flickering of images captured with different light intensities, if all the multiple video cameras 320 covering the same scene are synchronized.

The light sources 331, 332, 341, 342 may comprise a light-emitting diode (LED).

The light-emitting diode may e.g. emit in the infra-red wavelength range. However, LEDs with visible light or any other wavelength may also be used in the same way.

Exemplifying methods according to embodiments herein will now be described with reference to FIG. 3d and FIG. 3e and to a flowchart of FIG. 4, and with further reference to FIGS. 3a-3c.

Figure 3D:
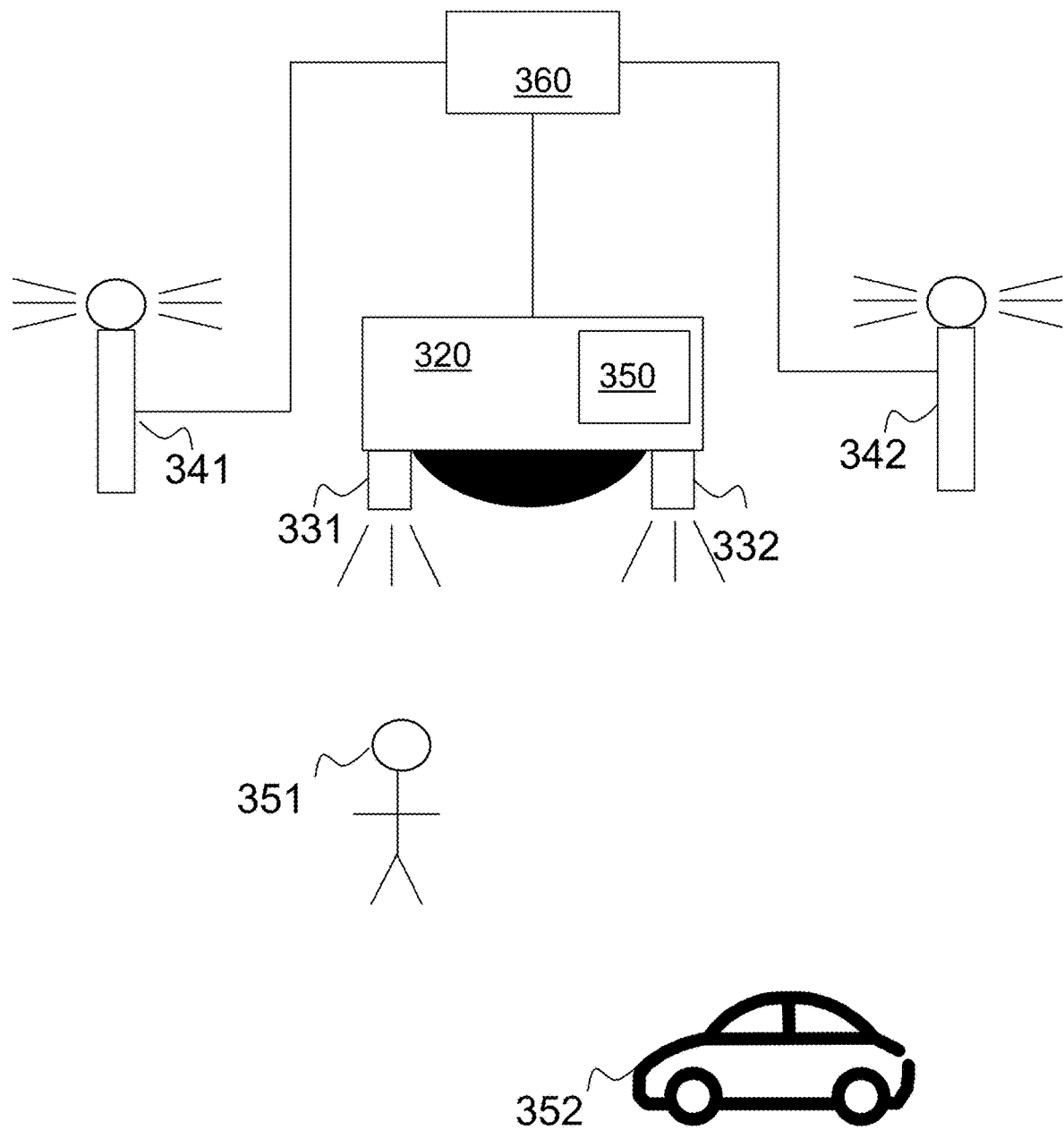
Figure 4:
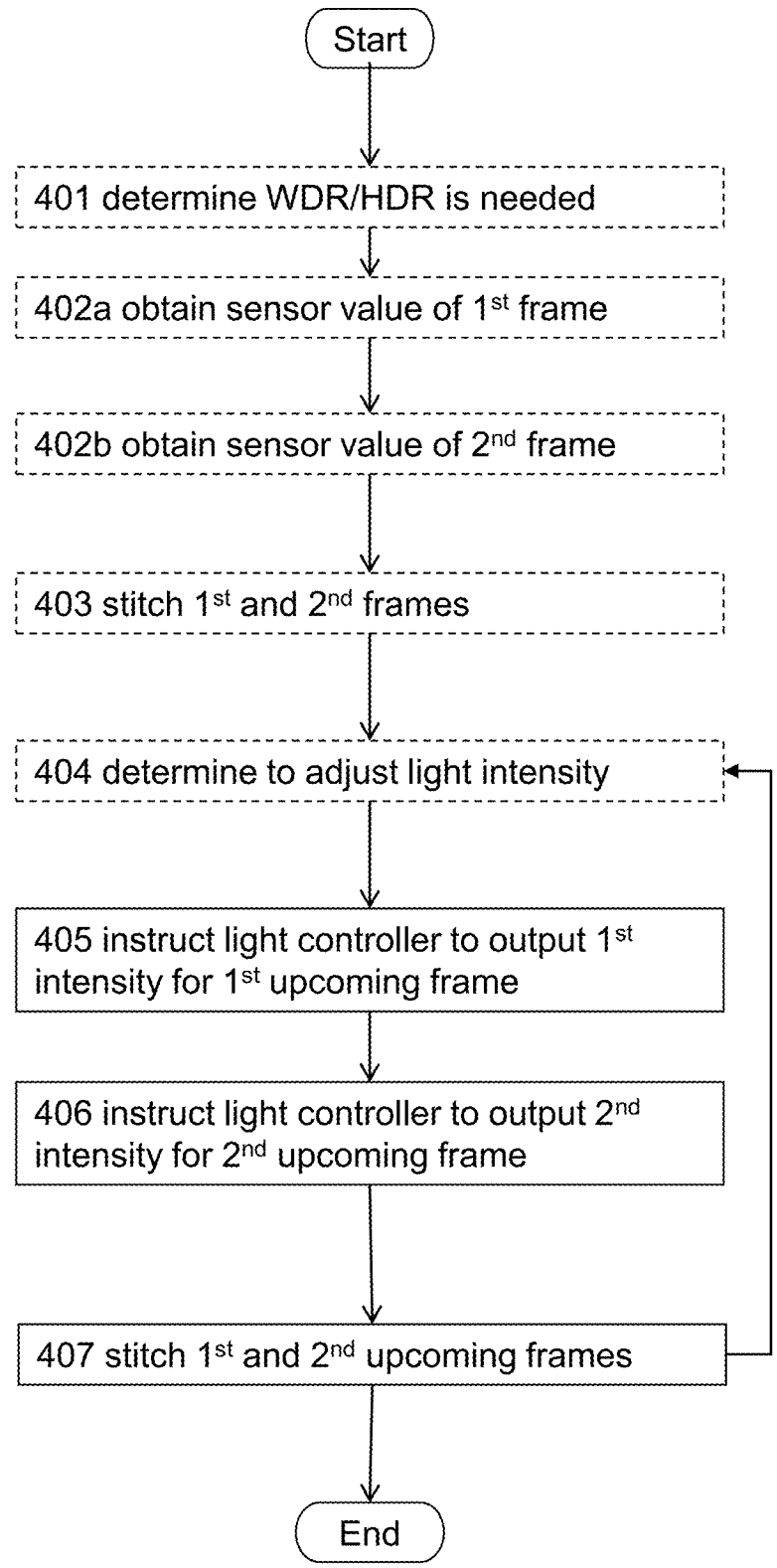
FIG. 4 is a flowchart illustrating embodiments of a method in an electronic device.

FIG. 3d resembles FIG. 3c but FIG. 3d also comprises an external controller 360 that controls the external light sources 341, 342. The internal controller 350 may be present also when there is an external controller. The video camera 320 is configured to communicate with the external controller 360 and may for example instruct the controller to control the external light sources 341, 342 in a particular way such as increasing or decreasing the light intensity from the external light sources 341, 342.

Figure 3E:
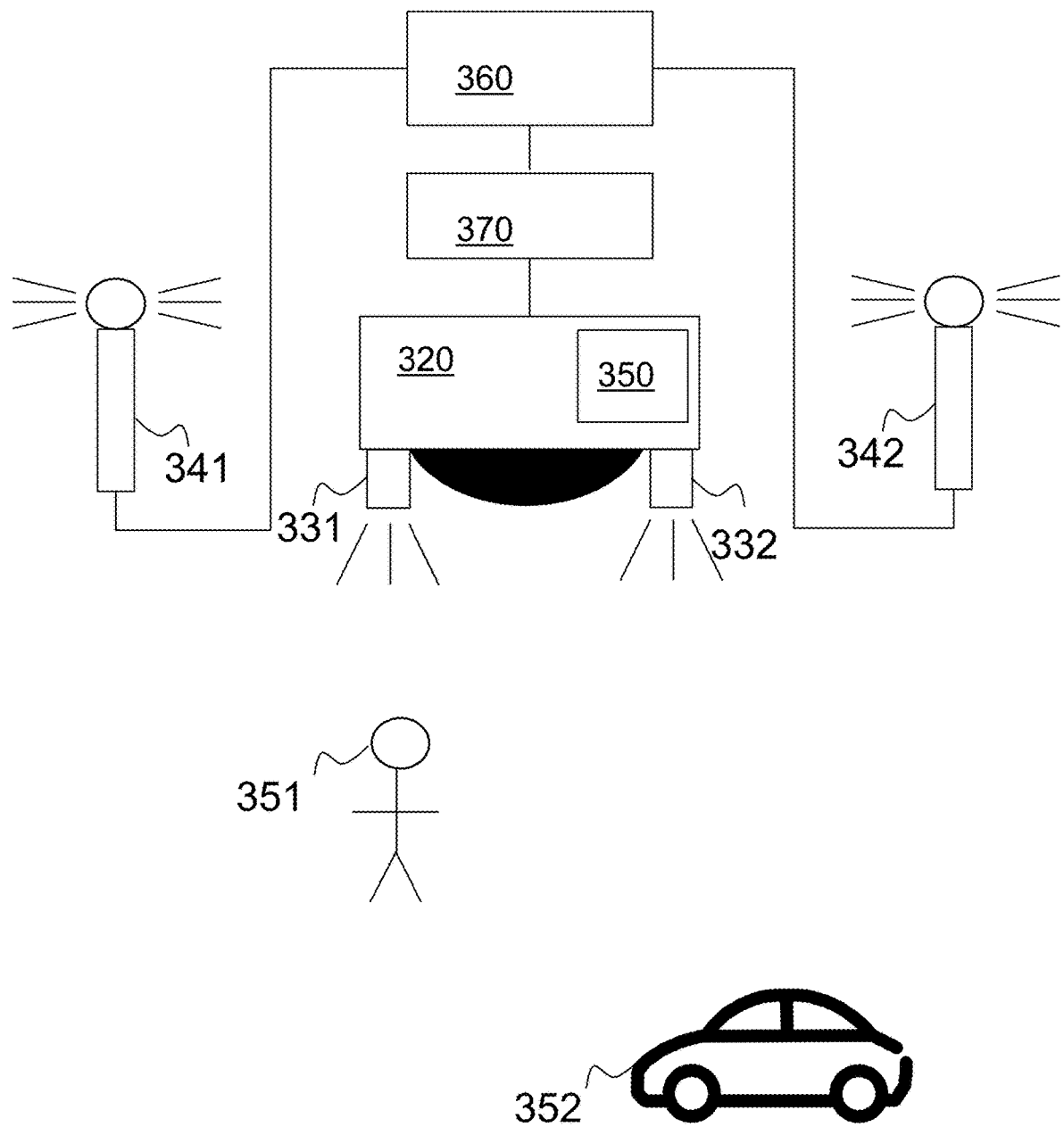

FIG. 3e resembles FIG. 3d but FIG. 3e also comprises a further electronic device 370 that instructs the external controller 360, or even the internal controller 350, to control the external light sources 341, 342. Thus, in FIG. 3e the video camera 320 may be configured to communicate with the further electronic device 370, which in turn may be configured to communicate with the external controller 360, and may for example instruct the controller to control the external light sources 341, 342. Thus, for a scenario of FIG. 3e the method that will be described below may be distributed among the video camera 320 and the further electronic device 370. The further electronic device 370 may for example be a smart phone, computer or tablet or similar. The communication between the video camera 320, the further electronic device 370 and the external controller 360 may be performed with wireless technology, such as WiFi or Bluetooth, or wired technology.

The methods for generating a high-dynamic range image may be implemented in an electronic device, such as the further electronic device 370, or any of the image-capturing devices 210 of FIG. 2a, and in particular the video camera 320 of FIGS. 3c-e. The implementation of embodiments herein in the video camera 320 is of particular relevance when performed in run-time of the video camera 320.

Although embodiments will be described below as performing actions on single image frames, the person skilled in the art will appreciate that the embodiments are equally applicable to a stream of images, e.g. from the video camera 320. For example, image frames described below may be part of a stream of images, and the actions may be performed for multiple images of the stream of images, e.g. for some or for each image of the stream of images. A first image frame may e.g. be exchanged for a first image frame of the stream of images. The actions may be performed continuously as the stream of images is captured and delivered to e.g. a client. One or more of the following actions presented in FIG. 4 may be performed in the following exemplifying order. In other examples, the order may differ from what is described below.

Action 401

In a scenario of FIG. 3c, where different objects are located far and close to the camera, the electronic device 320, 370, such as the video camera 320, may determine that a WDR/HDR method is needed to increase the dynamic range of captured images to better match the dynamic range of the scene. Embodiments herein may take advantage of such a WDR/HDR method to determine whether further enhancements to the WDR/HDR method will be needed by adjusting the light intensity of the light source 331, 332, e.g. by determining that the dynamic range of the scene is larger a than a threshold value. For example, it may be determined that the dynamic range of the scene is larger than the WDR/HDR method can handle, e.g. larger than a dynamic range of an image produced with the WDR/HDR method, such as an image obtained by stitching a long frame and a short frame. Then the light intensity of the light source 331, 332 may be adjusted accordingly. An example method of how to obtain the long and the short frame is described below in actions 402a and 402b, while action 404 describes an example method of how to determine whether to adjust the light intensity.

Action 402a

The image-capturing device 210 may obtain a stream of images 310 emanating from the image sensor 301. For example, in FIG. 3a the stream of images 310 comprises four image frames 311-314. The stream of images 310 may of course comprise many more image frames which are not depicted in FIG. 3a. In some embodiments the image-capturing device 210 measures a first sensor value of a first image frame 311 capturing a scene, such as the scene of FIG. 3c. The first image frame 311 may be part of the stream of images 310. The first sensor value may correspond to the light intensity at the pixels for a specific exposure value setting, such as a specific combination of an exposure time, an aperture opening, e.g. as set by an f-number, and a sensor gain. Sensor gain may also be referred to as sensitivity, e.g. according to the ISO-standard (ISO 100, ISO 200, etc.). Other exposure value settings may also be applied.

The first sensor value may comprise all individual pixel values or any statistical measure of these pixel values, such as an average value. How the first sensor value is used to determine whether to adjust the light intensity will be described below in action 404.

Action 402b

If action 402a have been performed above then the image-capturing device 210 further measures a second sensor value of a second image frame 312 capturing the scene. The second image frame 312 may for example be a consecutive image frame capturing the same scene. The second sensor value may be produced in a corresponding way as the first sensor value described above in action 402a.

A respective exposure value setting, which may correspond to a respective exposure time, sensor gain and f-number, is different for the first and second image frames 311, 312. For example, the exposure time and sensor gain for the first image 311 differs from the exposure time and sensor gain for the second image 312. For example, the exposure time of the first image 311 may be longer than the exposure time of the second image 312. In the following, in the context of WDR/HDR, an image frame with a higher exposure value setting will also be referred to as a long frame, while an image frame with a lower exposure value setting will also be referred to as a short frame, although the difference in exposure value settings may be an effect of a difference in sensor gains, aperture opening/f-numbers or any other difference in other settings that influence the exposure value of the sensor. How the second sensor value is used to determine whether to adjust the light intensity will be described below in action 404.

Action 403

The image-capturing device 210 may stitch the first and second image frames 311, 312 into the resulting HDR image frame 321 in response to the determination that WDR/HDR is needed in action 401 above.

The first and second image frames 311, 312 may be stitched irrespective of whether some or all of the following actions are performed. Thus, the first and second image frames 311, 312 may be stitched even if it is determined below in action 404 to adjust the light intensity in order to increase the dynamic range of stitched images.

As mentioned above, the stitched HDR image frame 321 may be part of a stream of images, e.g. a stream which may be sent to a client.

Action 404

If the electronic device, such as the image-capturing device 210, determines to adjust the light intensity of the light source 331, 332 then the electronic device, such as the image-capturing device 210, may perform a method according to actions 405 and 406 below. For example, the electronic device may determine that the dynamic range of the scene is larger than a threshold value, e.g. that the dynamic range of the scene is larger than the dynamic range of the image-capturing device 210, or of the stitched HDR image frame 321. Then the electronic device may determine to adjust the light intensity of the light source 331, 332 based on the determination that the dynamic range of the scene is larger than the threshold value.

Otherwise, if the dynamic range of the scene is below the threshold, then the image-capturing device 210 may continue capturing image frames while the electronic device does not perform actions 405 and 406 below, e.g. without different light intensities of the light source 331, 332. However, also if the dynamic range of the scene is below the threshold the electronic device may determine to adjust the light intensity of the light source 331, 332, for example in order to avoid an overcompensation due to an earlier adjustment.

In some embodiments the determining is based on the first sensor value of the first image frame 311, and further based on the second sensor value of the second image frame 312. For example, the image-capturing device 210 may produce output values from the pixels in a range 0-255, where 0 represents a low light intensity (low number of photons) and 255 represents a large light intensity (large number of photons). Then the image-capturing device 210 may determine how many pixel values of the long frame that equals or are below a first threshold value, e.g. 5, and how many pixel values of the short frame that equals or exceeds a second threshold, e.g. 250. Here it should be noted that even though the long frame has a higher exposure value setting than the short frame, the arrangement of the objects in the scene is such that the long frame is used to capture objects far away, while the short frame is used to capture objects closer to the image-capturing device 210. Thus, it is the low pixel values of the long frame and the high pixel values of the short frame that are important for determining whether the scene's dynamic range is too large or not.

Determining that the dynamic range of the scene is larger than the threshold value may then be based on how many pixel values that are above and below the thresholds. For example, if there are more than a first threshold number of pixel values of the long frame that is below 5, and there are more than a second threshold number of pixel values of the short frame that exceeds 250, then it may be determined to perform the enhanced WDR/HDR method according to actions 405 and 406 below.

In general, the determining may be based on one or more pixel-related measures of the first image frame 311, and further based on the one or more pixel-related measures of the second image frame 312.

In some other embodiments the determining of the dynamic range of the scene is based on one or more pixel-related measures of the stitched image frame 321.

Action 405

If it has been determined to perform the enhanced WDR/HDR method then the controller 350, 360 of the light source 331, 332 is instructed to control the light source 331, 332 to output a first intensity of light while the image-capturing device 210 captures the scene in a first upcoming image frame 313 with a first exposure value setting. The first exposure value setting may correspond to a first exposure time, a first sensor gain and a first aperture opening or f-number. The electronic device 320, 370 may instruct the light source 331, 332. As mentioned above, in embodiments herein the first upcoming image frame 313 is part of the image stream 310.

Action 406

Then the controller 350, 360 of the light source 331, 332 is instructed to control the light source 331, 332 to change from the first intensity of light to a second intensity of light such that the light source 331, 332 outputs the second intensity of light while the image-capturing device 210 captures the scene with a second upcoming image frame 314 with a second exposure value setting, which may correspond to a second exposure time, a second sensor gain and a second aperture opening used for the second upcoming image frame 314. The electronic device 320, 370 may instruct the light source 331, 332. As mentioned above, in embodiments herein the first upcoming image frame 313 is part of the image stream 310.

The second intensity of light is higher than the first intensity of light when the second exposure value setting is higher than the first exposure value setting, and
the second intensity of light is lower than the first intensity of light when the second exposure value setting is lower than the first exposure value setting.

For example, if the first exposure value setting is higher than the second exposure value setting, then the first intensity of light is higher than the second intensity of light. Of course, it is also possible to reverse the order of the exposures, such that the first exposure value setting is lower than the second exposure value setting. Then the first intensity of light is lower than the second intensity of light.

In some embodiments the first exposure value setting differs from the second exposure value setting by a different exposure time.

In some further embodiments the first exposure value setting corresponds to a combination of the first exposure time, the first sensor gain and the first aperture opening, while the second exposure value setting corresponds to a combination of the second exposure time, the second sensor gain and the second aperture opening. Further, in these embodiments the first exposure time may be longer than the second exposure time. In other words, for these embodiments the first exposure may be referred to as the long frame, and the second exposure may be referred to as the short frame.

Thus, in embodiments herein the first upcoming exposure may correspond to a long frame, while the second upcoming exposure may correspond to a short frame. As mentioned above, the long and short frame may correspond to other exposure value settings than time. For example, the long frame may correspond to a high sensor gain rather than a long time.

As a summary, irrespective of the order of the long and the short frame, the intensity of light is controlled to be higher for the long frame than for the short frame.

The instructions to control the first and second exposures may be sent individually but may also be sent together to the controller 350, 360. In order to avoid WDR motion artifacts the controller 350, 360 and the light source 331, 332 may need to be fast compared to the exposure time. However, in a static scene (where nothing is moving) the controller 350, 360 and the light source 331, 332 may operate more slowly since temporal information is not important.

Light sources positioned around the image-capturing device 210 may be utilized advantageously. If for example an object on the left side is close to the image-capturing device 210 it is possible to shut off or reduce the light intensity of the left side light sources and then merge the different frames in an appropriate way. The following paragraphs will outline details of such embodiments.

In some embodiments the light source 331, 332 comprises a first light source 331 and a second light source 332, which are individually controllable.

For such embodiments the first light source 331 may be selected to illuminate the scene for the first upcoming image frame 313, and the second light source 332 may be selected to illuminate the scene for the second image frame 314. The respective first and second light source 331, 332 may be selected based on a respective position of the respective light source 331, 332 in relation to a position of an object 351, 352 in the scene.

For example, the first light source 331 may be selected based on a first position of the first object 351 in the scene, while the second light source 332 is selected based on a second position of the second object 352 in the scene.

The image-capturing device 210 may select subsets of the light sources such as the first light source 331 and the second light source 332, e.g. by sending instructions to the controller 350, 360.

In another embodiment where the light source 220 comprises the first light source 331 and the second light source 332, the controller 350, 360 is instructed to control the first light source 331 and/or the second light source 332 such that the first light source 331 outputs a light intensity that is different than a light intensity of the second light source 332 for at least one of the first and second upcoming image frames 313, 314.

In some further embodiments the first object 351 is closer than the second object 352 to the image-capturing device 210, and the first light source 331 is closer than the second light source 332 to the first object 351, and the second light source 332 is closer than the first light source 331 to the second object 352. Then the controller 350, 360 is instructed to control the first light source 331 such that the light intensity of the first light source 331 is:

lower for the second upcoming image frame 314 than for the first upcoming image frame 313 when the first exposure value setting is higher than the second exposure value setting, and higher for the second upcoming image frame 314 than for the first upcoming image frame 313 when the first exposure value setting is lower than the second exposure value setting.

While the light intensity of the first light source 331 may be lowered for the second image frame 314 according to the some of the above embodiments, the light intensity of the second light source 332 may also be increased during the long exposure, e.g. during the second image frame 314. In other words, the light intensity may be increased during the long exposure for the light source positioned on the same side of the image-capturing device 210 as the object that is far from the image-capturing device 210, e.g. in the background.

An advantage of embodiments herein is that they may take into account positions of multiple light sources in relation to the objects in the scene, such that objects near and far away may be illuminated more optimally. For example, objects in the background, or far from the image-capturing device 210, may be captured in a more optimal way, e.g. by increasing the light intensity from a light source which is closer to the background than other light sources during a long frame that is used to capture the details of the background. If a light source on the right side of the image-capturing device 210 is closer to the background, then this light source can be controlled to increase the light intensity during the long frame. In a corresponding way a light source closer to an object in a foreground can also be controlled, e.g. such a light source can be controlled to lower its intensity during the short frame.

In all embodiments above, the electronic device 320, 370 may instruct the controller 350, 360 of the light source 331, 332.

Action 407

When the two upcoming image frames 313, 314 have been captured the first upcoming image frame 313 is stitched with the second upcoming image frame 314 into a high-dynamic range image frame 322. As mentioned above, the stitching of the two upcoming image frames 313, 314 is schematically illustrated in FIG. 3b. In the same way as described above in relation to the stitched HDR image frame 321, the stitched high-dynamic range image frame 322 may be part of a stream of images, e.g. a stream which may be sent to a client. For example, the stitched image frames 321, 322 may be part of the same stream of images.

The stitching may involve blending the two upcoming image frames 313, 314 using different weights for the respective image frame. Different weights may also be applied to different parts of the respective image frame. For example, it is possible to blend the background part of the long frame with the foreground part of the short frame.

In a corresponding way as described above for two upcoming images, more than two upcoming images captured with different exposure value settings and different light intensities may also be stitched to produce a single stitched image. For example, a third upcoming image frame may be captured with a third exposure value setting while the light source 331, 332 outputs a third intensity which is different from the first and second intensities. The third intensity is based on the third exposure value setting. For example, if the third exposure value setting is lower than the first exposure value setting, but higher than the second exposure value setting, then the third intensity is lower than the first intensity and higher than the second intensity.

Figure 5:
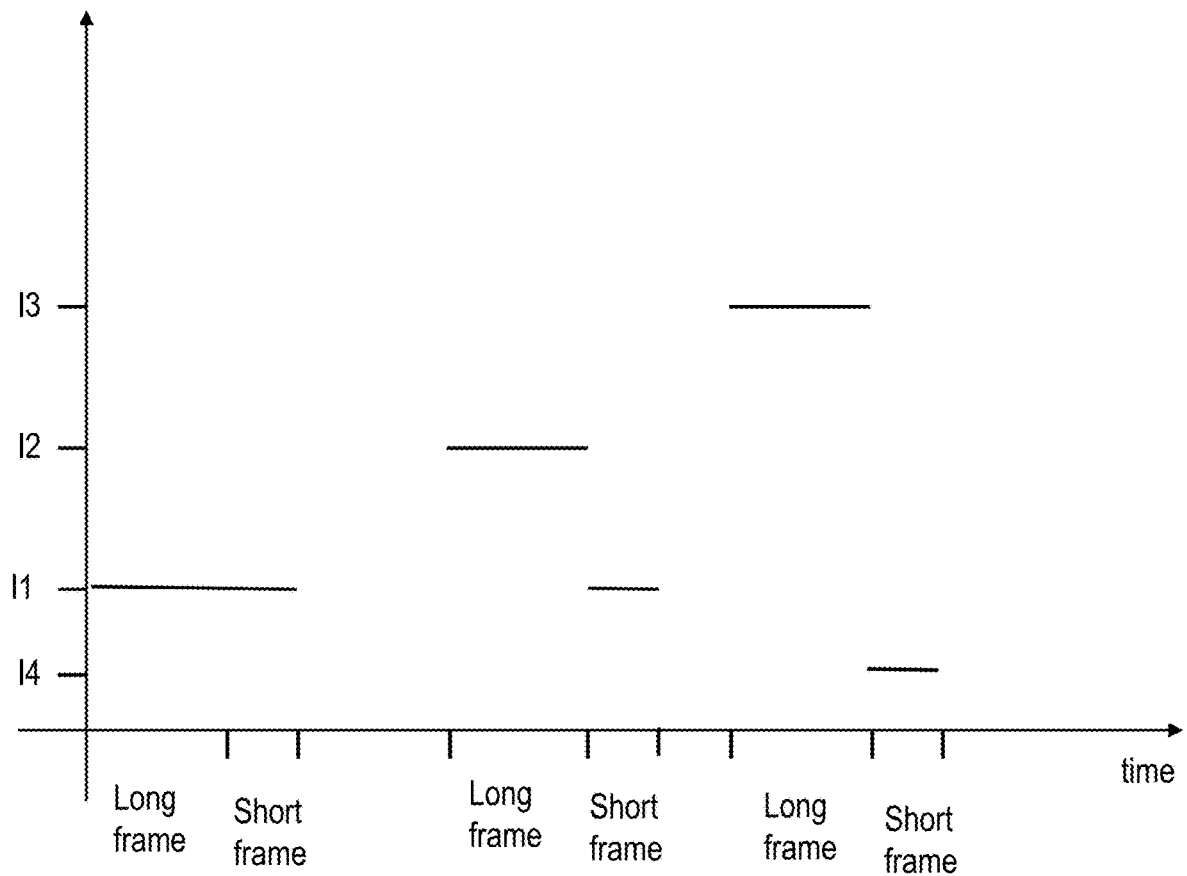
FIG. 5 illustrates further embodiments of a method herein.

FIG. 5 illustrates a graph representing the light intensity versus time for three consecutive pairs of image frames. The first pair of image frames in FIG. 5 is used for checking whether the dynamic range of the scene is larger than the threshold value, i.e. the first pair is used according to actions 401-404 above. As can be seen, the light intensity I1 for the first pair of image frames is constant, or at least not significantly different. When it has been determined to use the enhanced WDR/HDR method then the light intensity is different during the long and the short frame of the next upcoming pair of image frames. During the long frame the light intensity is at a level I2 which is higher than the intensity I3 of the short frame. If this adjustment of the light intensities during the upcoming long and short frames is not enough to reproduce the dynamic range of the scene in the stitched image comprising the upcoming long and short frames, then further long and short frames may be captured. For example, the further long frame may be captured at an intensity I3 higher than the previous long frame, while the further short frame may be captured at an intensity I4 lower than the previous short frame.

By stitching two image frames of the same scene from the same image stream with two different exposure setting values, where the light intensity from the light source is higher for the frame with the high exposure value setting, e.g. high values of exposure time and sensor gain, than for the frame with the lower exposure value setting, the dynamic range of the scene that can be captured with the image-capturing device can be increased.

The above method may be continuously applied. For example, further determinations according to action 404 above, related to further upcoming image frames, may be based on the first and second upcoming image frames 313, 314 described above, or the high-dynamic range image frame 322 generated from the first and second upcoming image frames 313, 314. An example embodiment of continuously applying the above method is indicated by an arrow from action 407 to action 404 in FIG. 4. For such embodiments action 404 may comprise actions 402a and 402b, and also action 401. These actions may then be applied to the first and second upcoming image frames 313, 314 in a similar manner as described above for the first and second image frames 311, 312.

Figure 6:
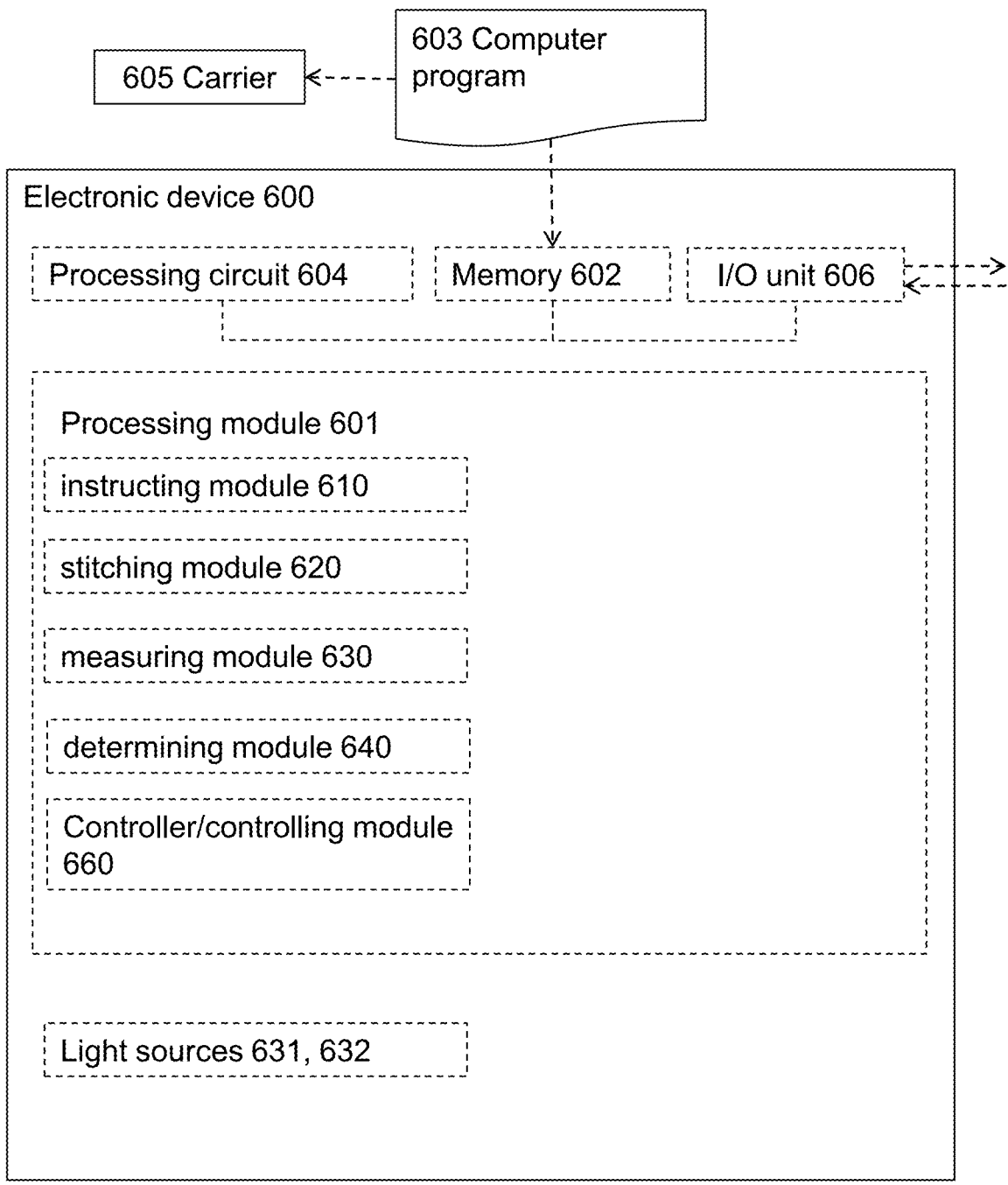
FIG. 6 is a block diagram illustrating embodiments of the electronic device.

With reference to FIG. 6, a schematic block diagram of embodiments of an electronic device 600 is shown. The electronic device 600 is configured to generate the high-dynamic range image. As mentioned above, the electronic device 600 may comprise the image-capturing device 210, such as the video camera 320, a monitoring camera, a network video recorder, or a wireless communication device.

The electronic device 600 may comprise a processing module 601, such as a means for performing the methods described herein. The means may be embodied in the form of one or more hardware modules and/or one or more software modules The electronic device 600 may further comprise a memory 602. The memory may comprise, such as contain or store, instructions, e.g. in the form of a computer program 603, which may comprise computer readable code units which when executed on the electronic device 600 causes the electronic device 600 to perform the method of generating the high-dynamic range image.

According to some embodiments herein, the electronic device 600 and/or the processing module 601 comprises a processing circuit 604 as an exemplifying hardware module, which may comprise one or more processors. Accordingly, the processing module 601 may be embodied in the form of, or 'realized by', the processing circuit 604. The instructions may be executable by the processing circuit 604, whereby the electronic device 600 is operative to perform the methods of FIG. 4. As another example, the instructions, when executed by the electronic device 600 and/or the processing circuit 604, may cause the electronic device 600 to perform the method according to FIG. 4.

In view of the above, in one example, there is provided an electronic device 600 for generating the high-dynamic range image. Again, the memory 602 contains the instructions executable by said processing circuit 604 whereby the electronic device 600 is operative for performing the method according to FIG. 4. The method comprises instructing the controller 350, 360 of the light source 331, 332 to control the light source 331, 332 to output the first intensity of light while an image-capturing device 210 captures the scene in the first upcoming image frame 313 with the first exposure value setting, and instructing the controller 360 of the light source 331, 332 to control the light source 331, 332 to change from the first intensity of light to the second intensity of light such that the light source 331, 332 outputs the second intensity of light while the image-capturing device 210 captures the scene with the second upcoming image frame 314 with the second exposure value setting.

The second intensity of light is higher than the first intensity of light when the second exposure value setting is higher than the first exposure value setting, and the second intensity of light is lower than the first intensity of light when the second exposure value setting is lower than the first exposure value setting.

The method further comprises stitching the first upcoming image frame 313 with the second upcoming image frame 314 into the high-dynamic range image frame 322.

The electronic device 600 may further be operative to perform the methods according to the detailed embodiments described above in connection to FIG. 4.

FIG. 6 further illustrates a carrier 605, or program carrier, which comprises the computer program 603 as described directly above. The carrier 605 may be one of an electronic signal, an optical signal, a radio signal and a computer readable medium.

In some embodiments, the electronic device 600 and/or the processing module 601 may comprise one or more of an instructing module 610, a stitching module 620, a measuring module 630, a determining module 640, a controller module 650, as exemplifying hardware modules. In other examples, one or more of the aforementioned exemplifying hardware modules may be implemented as one or more software modules.

Moreover, the electronic device 600 may comprises one or more light sources 631, 632.

Moreover, the processing module 601 may comprise an Input/Output unit 606. According to an embodiment, the Input/Output unit 606 may comprise an image sensor configured for capturing the image frames described above such as the first upcoming image frame 313 and the second upcoming image frame 314.

Accordingly, the electronic device 600 is configured for generating the high-dynamic range image.

Therefore, according to the various embodiments described above, the electronic device 600 and/or the processing module 601 and/or the instructing module 610 is configured for instructing the controller 350, 360 of the light source 331, 332 to control the light source 331, 332 to output the first intensity of light while an image-capturing device 210 captures the scene in the first upcoming image frame 313 with the first exposure value setting, and instructing the controller 350, 360 of the light source 331, 332 to control the light source 331, 332 to change from the first intensity of light to the second intensity of light such that the light source 331, 332 outputs the second intensity of light while the image-capturing device 210 captures the scene with the second upcoming image frame 314 with the second exposure value setting.

The second intensity of light is higher than the first intensity of light when the second exposure value setting is higher than the first exposure value setting, and the second intensity of light is lower than the first intensity of light when the second exposure value setting is lower than the first exposure value setting.

In some embodiments the light source 331, 332 comprises the first light source 331 and the second light source 332. Then the controller 350, 360 may be instructed to control the first light source 331 and/or the second light source 332 such that the first light source 331 outputs the light intensity that differs from the light intensity of the second light source 332 for at least one of the first and second image frames 313, 314.

In some further embodiments the first object 351 is closer than the second object 352 to the image-capturing device 210, and the first light source 331 is closer than the second light source 332 to the first object 351, and the second light source 332 is closer than the first light source 331 to the second object 352.

Then the controller 350, 360 is instructed to control the first light source 331 such that the light intensity of the first light source 331 is:

lower for the second upcoming image frame 314 than for the first upcoming image frame 313 when the first exposure value setting is higher than the second exposure value setting, and higher for the second upcoming image frame 314 than for the first upcoming image frame 313 when the first exposure value setting is lower than the second exposure value setting.

The electronic device 600 and/or the processing module 601 and/or the stitching module 620 is configured for stitching the first upcoming image frame 313 with the second upcoming image frame 314 into the high-dynamic range image frame 322.

The electronic device 600 and/or the processing module 601 and/or the measuring module 630 may be configured for measuring the first sensor value of the first image frame 311 capturing the scene, and measuring 402b the second sensor value of the second image frame 312 capturing the scene. The respective exposure value setting is different for the first and second image frames 311, 312.

The electronic device 600 and/or the processing module 601 and/or the determining module 640 may be configured for determining to adjust the light intensity of the light source 331, 332. The determining is based on the first sensor value of the first image frame 311, and further based on the second sensor value of the second image frame 312. For example, it may be determined to adjust the light intensity of the light source 331, 332 if the dynamic range of the scene is larger than the threshold value.

The electronic device 600 and/or the processing module 601 and/or the controller module 650 may be configured for selecting light sources to illuminate the scene, and further configured to control the light intensities of the light sources 331, 332.

For example, in some embodiments the light source 331, 332 comprises the first light source 331 and the second light source 332, which are individually controllable. Then the first light source 331 may be selected to illuminate the scene for the first image frame 313, and the second light source 332 may be selected to illuminate the scene for the second image frame 314, and the respective first and second light source 331, 332 is selected based on the respective position of the respective light source 331, 332 in relation to the position of an object 351, 352 in the scene.

In some further embodiments the first light source 331 is selected based on the first position of the first object 351 in the scene, while the second light source 332 is selected based on the second position of the second object 352 in the scene.

As used herein, the term "module" may refer to one or more functional modules, each of which may be implemented as one or more hardware modules and/or one or more software modules and/or a combined software/hardware module. In some examples, the module may represent a functional unit realized as software and/or hardware.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a obtaining means, linear function or transform means, rotation means, projecting means, pseudo-colouring means, edge enhancing means or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method for generating a high-dynamic range image, the method comprises:
   determining to adjust a light intensity of a light source illuminating a scene to be captured by an image-capturing device in two upcoming image frames, wherein the light intensity is to be adjusted between the two upcoming image frames to be captured and wherein the determining is based on a determination that the dynamic range of the scene is larger than a threshold value;

instructing a controller of the light source to control the light source to output a first intensity of light while an image-capturing device captures a scene in a first upcoming image frame with a first exposure value setting influencing a first exposure value of an image sensor of the image-capturing device;

instructing the controller of the light source to control the light source to change from the first intensity of light to a second intensity of light such that the light source outputs the second intensity of light while the image-capturing device captures the scene with a second upcoming image frame with a second exposure value setting influencing a second exposure value of the image sensor, wherein the second exposure value setting differs from the first exposure value setting, the second intensity of light is higher than the first intensity of light when the second exposure value setting is higher than the first exposure value setting, the second intensity of light is lower than the first intensity of light when the second exposure value setting is lower than the first exposure value setting, wherein a high exposure value setting corresponds to a high exposure value of the image sensor; and stitching the first upcoming image frame with the second upcoming image frame into a high-dynamic range image frame.

2. The method according to claim 1, wherein a high exposure value setting corresponds to high values of exposure time and/or sensor gain.

3. The method according to claim 1, wherein one of the first upcoming image frame and the second upcoming image frame is a long frame, which corresponds to an image frame captured with a high exposure value setting, and wherein the other one of the first upcoming image frame and the second upcoming image frame is a short frame, which corresponds to an image frame captured with a low exposure value setting, and wherein stitching the first upcoming image frame with the second upcoming image frame into the high-dynamic range image frame comprises blending a background part of the long frame with a foreground part of the short frame.

4. The method according to claim 1, further comprising: measuring a first sensor value of a first image frame capturing the scene, measuring a second sensor value of a second image frame capturing the scene, wherein a respective exposure value setting is different for the first and second image frames, and wherein a light intensity (I1) of the light source illuminating the scene is not significantly different when capturing the first image frame and the second image frame, and wherein determining to adjust the light intensity of the light source based on a determination that the dynamic range of the scene is larger than the threshold value wherein the determining is based on the first sensor value of the first image frame, and further based on the second sensor value of the second image frame.

5. The method according to claim 4, wherein one of the first image frame and the second image frame is a long frame and another one of the first image frame and the second image frame is a short frame, wherein the long frame has a higher exposure value setting than the short frame, and wherein the determining comprises determining how many pixel values of the long frame that equals or are below a first threshold value, and how many pixel values of the short frame that equals or exceeds a second threshold.

6. The method according to claim 1, wherein the light source comprises a first light source and a second light source, which are individually controllable, and the first light source is selected to illuminate the scene for the first upcoming image frame, and the second light source is selected to illuminate the scene for the second upcoming image frame, wherein the respective first and second light source is selected based on a respective position of the respective light source in relation to a position of an object in the scene.

7. The method according to claim 6, wherein the first light source is selected based on a first position of a first object in the scene, while the second light source is selected based on a second position of a second object in the scene.

8. The method according to claim 1, wherein the light source comprises the first light source and the second light source, further comprising:

instructing the controller to control the first light source and/or the second light source such that the first light source outputs a light intensity that differs from a light intensity of the second light source for at least one of the first and second upcoming image frames.

9. The method according to claim 1, and the first object is closer than the second object to the image-capturing device, and the first light source is closer than the second light source to the first object, and the second light source is closer than the first light source to the second object, further comprising:

instructing the controller to control the first light source such that the light intensity of the first light source is:

lower for the second upcoming image frame than for the first upcoming image frame when the first exposure value setting is higher than the second exposure value setting, and higher for the second upcoming image frame than for the first upcoming image frame when the first exposure value setting is lower than the second exposure value setting.

10. The method according to claim 1, wherein the first exposure value setting differs from the second exposure value setting by a different exposure time.

11. The method according to claim 1, wherein the first exposure value setting corresponds to a combination of a first exposure time, a first sensor gain and a first aperture opening, and wherein the second exposure value setting corresponds to a combination of a second exposure time, a second sensor gain and a second aperture opening, wherein the first exposure time is longer than the second exposure time.

12. An electronic device comprising a processing module configured to perform the method according to claim 1.

13. The electronic device according to claim 12 comprising an image-capturing device, such as a camera, surveillance camera, a monitoring camera, a network video recorder, or a wireless communication device.

14. A non-transitory computer readable storage device that has a computer program, comprising computer readable code units stored therein that when executed on an electronic device causes the electronic device to perform the method according to claim 1.

* * * * *